(No Model.) 4 Sheets—Sheet 4.
W. G. CROOK.
COMBINED BICYCLE BRAKE AND ALARM.
No. 540,640. Patented June 11, 1895.
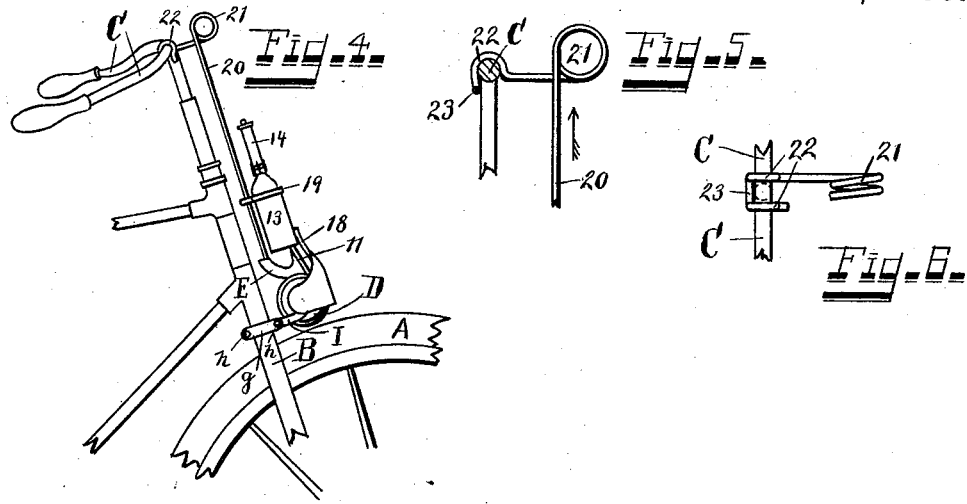
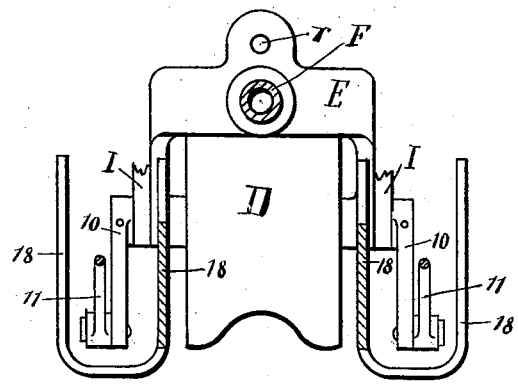
Witnesses:
Frank Koehne
E. Koehne
Inventor.
William G. Crook
By Ira C. Koehne
His Attorney.

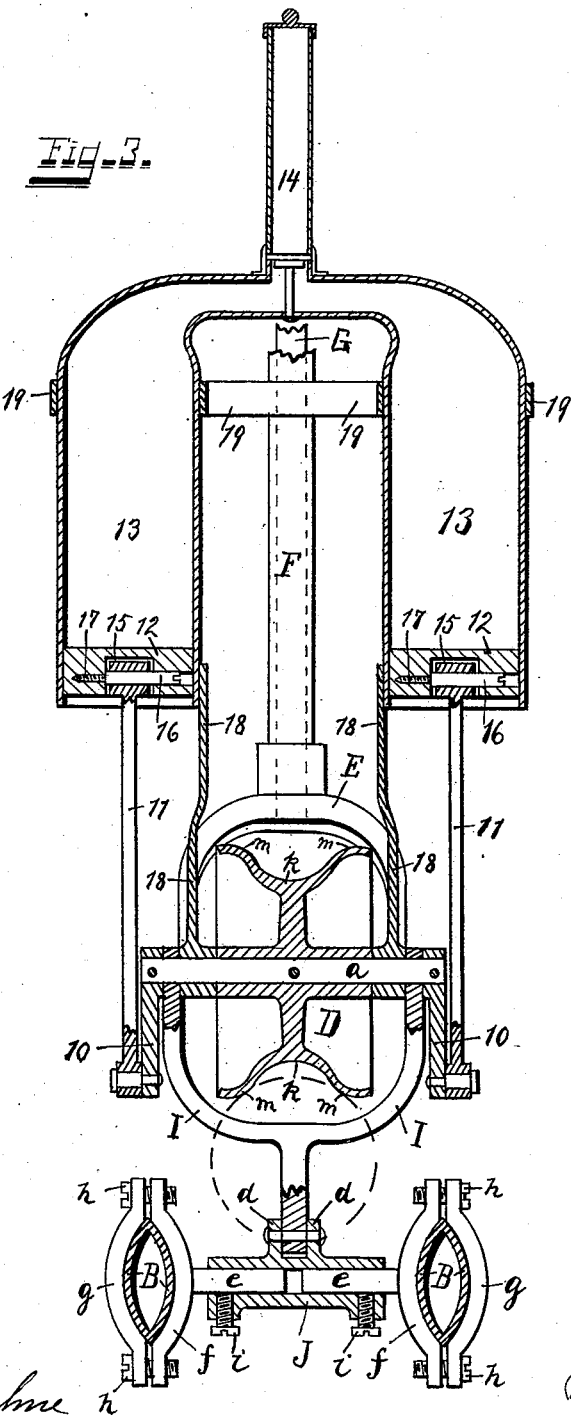

UNITED STATES PATENT OFFICE.

WILLIAM G. CROOK, OF NELSONVILLE, OHIO.

COMBINED BICYCLE BRAKE AND ALARM.

SPECIFICATION forming part of Letters Patent No. 540,640, dated June 11, 1895.

Application filed October 19, 1894. Serial No. 526,347. (No model.)

*To all whom it may concern:*

Be it known that I, WILLIAM G. CROOK, residing at Nelsonville, in the county of Athens and State of Ohio, have invented a new and useful Improvement in a Combined Bicycle Brake and Alarm, of which the following is a specification.

My present invention consists in the details of construction hereinafter described and more particularly mentioned in the claims.

My invention relates to improvements in a combined alarm and brake for bicycles in which a supplemental roller contacts at will with one of the moving wheels of the machine for causing pistons to reciprocate in chambers communicating with a wind-instrument, and thus produce an alarm; and it particularly relates to the means for mounting the parts upon the steering forks of the machine, as well as the arrangement of guards to protect from injury the mechanism intermediate said roller and pistons and which reciprocates said pistons.

The objects of my invention are to provide a neat, simple and durable alarm for bicycles, &c., which will at the same time, when desirable, form an effective brake without injuring the pneumatic tire. These objects are accomplished in the manner illustrated in the accompanying drawings, in which—

Figure 1:
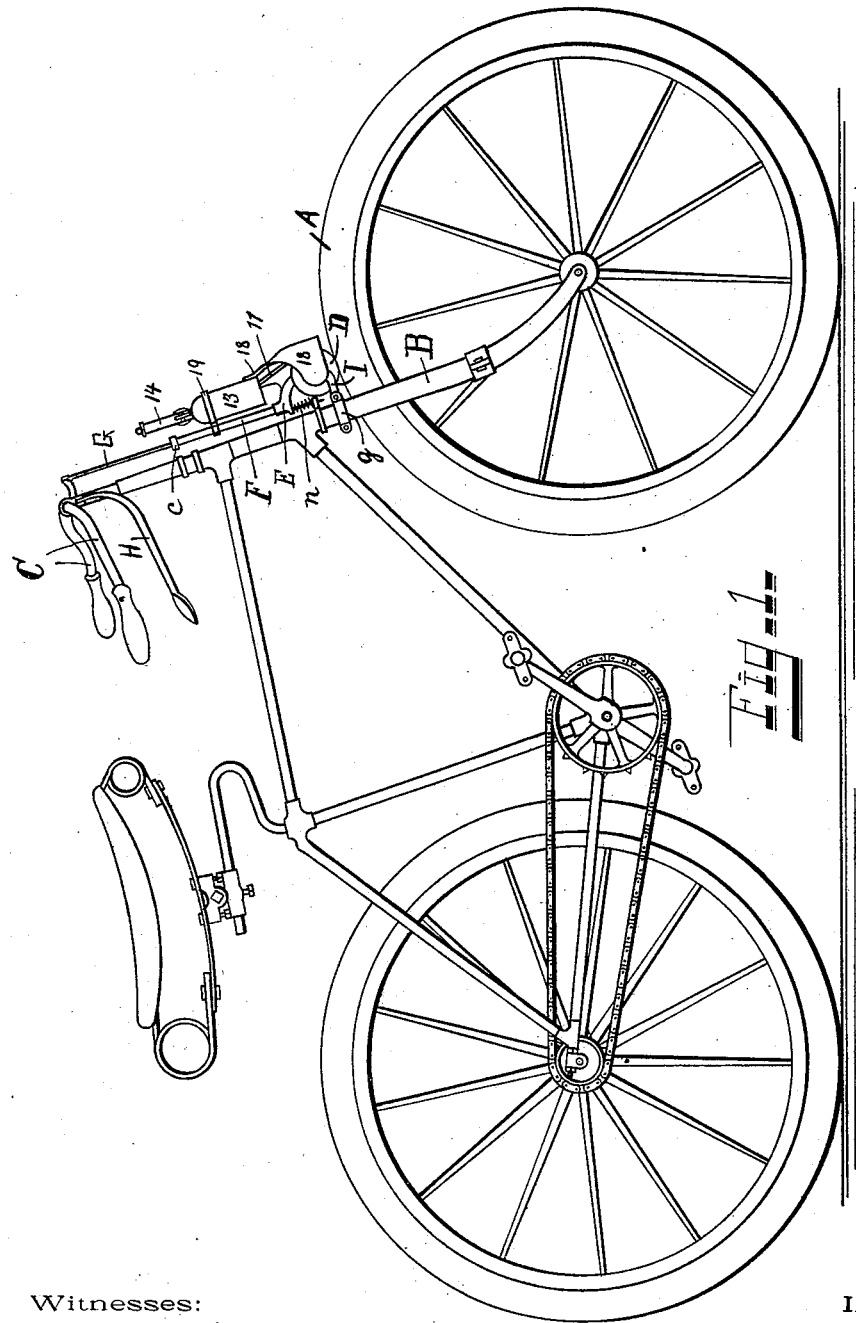
Figure 2:
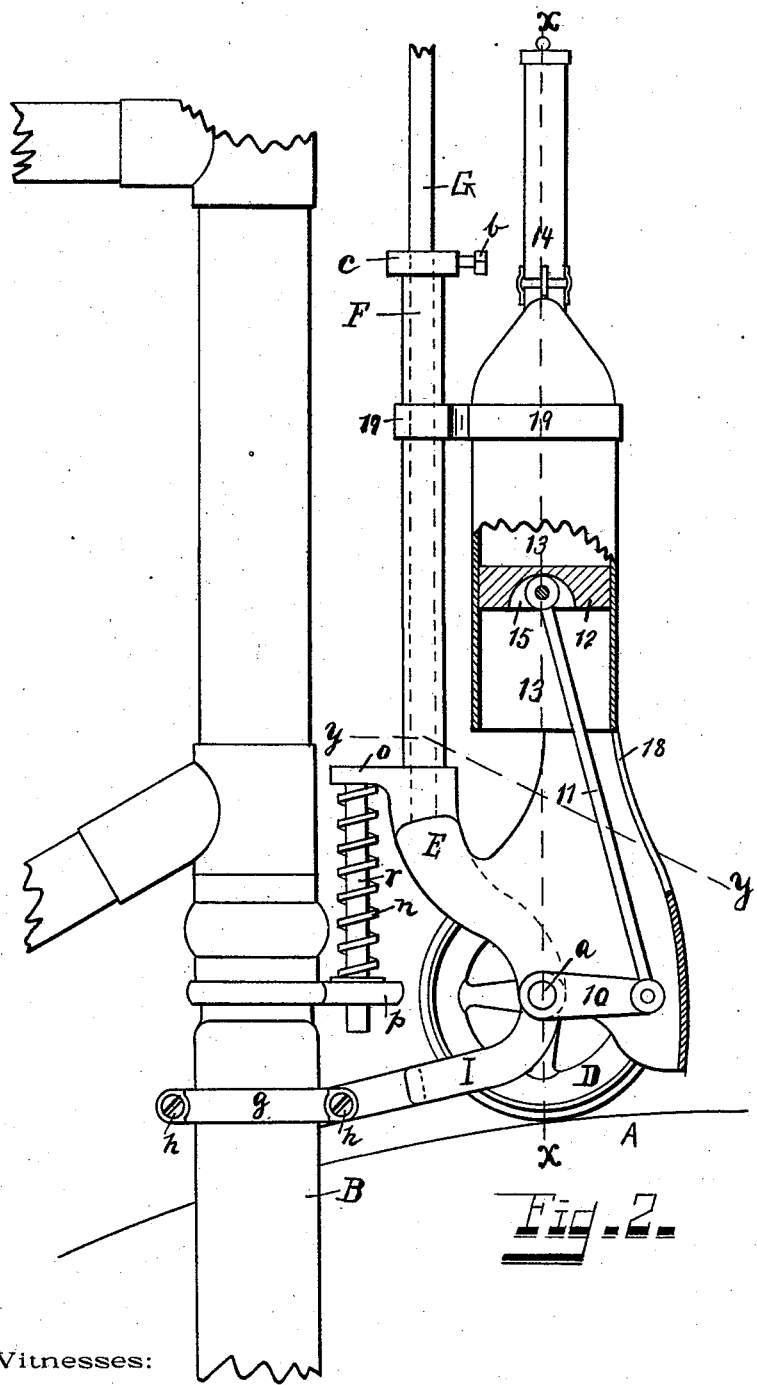

Figure 1 is a side elevation of a bicycle, showing my invention attached. Fig. 2 is an enlarged side elevation of my improved device with parts broken away for clearness.
Fig. 3 is a section on line X X of Fig. 2 and showing bracket I and its securing-clamps *f* and *g* dropped down parallel with said section-line. Fig. 4 is a side elevation of my improved device, illustrating a modified form of operating-rod. Figs. 5 and 6 illustrate details of construction of said modified form of said operating-rod, and Fig. 7 is a sectional plan view on line Y Y of Fig. 2.

Like characters of reference are employed to designate identical parts throughout the drawings and description.

"A" represents the front wheel, "B" the steering forks and "C" their operating handle bars.
Wheel "D" is rigidly secured to a shaft *a* which turns freely in its bearings in bracket "E" secured to the lower end of tube "F" receiving in its bore the lower end of a rod "G" whose upper end is pivoted to the fulcrumed brake lever "H" of ordinary construction. Tube "F" in rod "G" constitutes the ordinary form of extensible brake rod and are clamped together at convenient heights by a screw "*b*" threaded into collar "*c*" solid with, or loose upon, tube "F." The shaft "*a*" projects from its bearings in bracket "E" where it also is provided with a bearing in each of the forward bifurcated ends of a bracket "I," Figs. 2 and 3, whose rear end is pivoted to lugs "*d*" of sleeve "J" receiving in its bore, from opposite ends, the stems *e* of clamp jaws *f* having mating jaws "*g*" secured to said jaws *f* by screws *h*. These jaws *f* and *g*, Fig. 3, embrace the steering forks B for maintaining wheel D in an operative position, and as these forks B vary in width in different makes of bicycles the jaws *f* and *g* are provided with an adjustment for width as described, while screws *i* are threaded into sleeve J to clamp said stems *e* and maintain the positions of jaws *f* and *g*. The periphery of wheel "D" is provided with a concave recess *k* in the center of its width, said recess *k* extending completely around the wheel "D" and being of less width than the diameter of tire of wheel "A." Shown in dotted lines in Fig. 3. The edges *m* adjacent to recess *k* are formed convex, as shown, to prevent their marking or cutting the tire.

So much of my invention as above described may be employed as an efficent and tire saving brake in which capacity, upon applying downward pressure to wheel "D," the recess *k* and its convex edges *m* forming the periphery of wheel "D," cause the tire to assume their shape directly under said wheel "D." The kneading of the tire by wheel "D," and mainly by the friction of the tire coming into and going out of recess *k* of said freely revolving wheel "D," are the elements producing the above brake, which heretofore has been accomplished by retarding the movement of the roller by applying friction washers, &c., to the spindle of said roller. On operating brake lever "H" the wheel "D" is forced downward, its bracket "I" swinging on its pivot in lugs *d*, Figs. 2 and 3, until sufficient pressure is placed upon said lever "H" to cause the wheel "D" to properly check the motion of the bicycle. On releasing lever "H" a spring $n$ pressed between lug $o$ on bracket "E" and lug $p$ on the forks "B" causes the parts to be returned to normal position, while a pin $r$ secured to lug $o$ and moving freely in the opening in lug $p$ prevents the spring $n$ from becoming misplaced.
The alarm features of my invention will now be described.

Rigidly secured to the respective ends of shaft $a$, projecting from bearings in bracket 'I," are cranks 10, Figs. 2, 3 and 7, operating 'pistons 12 through connecting rods 11. The pistons 12 are made of suitable wood or other light material and they reciprocate in tubular chambers 13 open at their lower ends and whose upper ends are united together and communicate with the whistle 14 of well known form.

The pistons 12 are provided with recess 15, Figs. 2 and 3, in which rests the end of connecting rod 11, while a pin 16 pierces one side of said piston and said recess 15 to pivot said connecting rods 11 to said pistons. The pins 16 are provided with a screw threaded end 17 which prevents the pin 16 from being misplaced and scraping the sides of chambers 13, while the other ends of pins 16 are slotted in the form of a screw to facilitate their insertion. Integral with, or secured to bracket "E," are guards 18, Figs. 2, 3, and 7, which shield from injury the crank 10 and rods 11, as shown, while a portion of said guards 18 rise upward and secure the lower ends of the chambers 13 whose upper ends are secured by bracket 19 to the tube "F" as shown in Figs. 1, 2, and 3.
When lever "H" is operated and wheel "D" brought lightly in contact with wheel "A," said wheel "D" revolves; reciprocating the pistons 12 causing air to be alternately forced outward and inward through whistle 14, and when the air is forced outward through said whistle, it sounds an alarm.

In Figs. 4, 5, and 6 I have shown a modified form of operating rod which is designed for use on bicycles where the alarm feature of my invention is the only feature required. In this modification I have dispensed with lever "H," rod "G," tube "F," spring $n$, ron $r$ and lugs $o$ and $p$, and substituted therefor a rod 20, preferably of spring wire, which is provided at its top with a series of coils 21 from which the free end of rod 20 is led rearward to the handle-bars "C" where it is formed into two "U" shaped spring clamps 22 connected at the rear side by the cross piece 23, and which clamps 22 occupy a position on the opposite sides of where the handle-bars "C" join with the steering frame. The coils 21 tend to elevate rod 20 in the direction of the arrow in Fig. 5, turning the clamps 22 on the handle-bars "C," while the cross piece 23 contacting with the steering frame regulates the extent of the upward movement of rod 20. To sound an alarm, the rider places his hand upon the coils 21 and lightly presses downward causing wheel "D" to contact with wheel "A" and operate the alarm, as before described. I had contemplated filing a separate application on the features disclosed in this modification, but finally concluded to embody it in this application claiming the specific device in combination with any suitable operating rod, and then claiming in combination the specific form of operating rod shown in Figs. 1, 2, and 3; and in this connection I wish it to be distinctly understood that any desirable operating rod may be employed in the use of my device without departure from the spirit of my invention.

Having now fully described my invention, what I claim, and pray to secure by Letters Patent, is—

1. The combination of the forks "B," wheel "A," the clamps $f$ and $g$ embracing said forks "B," stems $e$ on clamp jaws $f$, sleeve "J" for said stems $e$, screws $i$ clamping stems $e$ in sleeve J, screws $h$ for tightening clamps $f$ and $g$, bracket "I" pivoted to sleeve "J" at one end and carrying wheel "D" in the other, and an operating rod for forcing said wheel "D" in contact with wheel "A," substantially as and for the purpose specified.

2. The combination of a wheel "A," a wheel "D" mounted to turn freely in bearings in a bracket "E," carried by sleeve J supported on stems $e$ secured to forks B by clamps $f$ and $g$, the periphery of said wheel "D" being formed with a central recess $k$ having convexed edges $m$, a tube "F" secured to bracket "E," a rod "G" adjustable in the bore of tube "F," means for locking rod "G" and tube "F" together at convenient points, a fulcrumed operating lever "H" pivoted to rod "G," for forcing said wheel "D" to contact with wheel "A," and a spring for returning said parts to normal position, substantially as and for the purpose specified.

3. The combination of a wheel "A," forks "B," the clamps $f$ and $g$ embracing said forks, a pivoted bracket "I" supported by said clamps, a wheel "D" mounted rigidly on shaft $a$ turning freely in bearings in the bracket "I," one or more cranks 10 rigidly attached to shaft $a$, one or more rods 11 connecting said cranks with one or more pistons 12 operating in a corresponding number of chambers 13 open at the bottom and connected at their top with the whistle 14, and an operating rod for forcing said wheel to contact with wheel "A," substantially as and for the purpose specified.

4. The combination of the wheel "A," forks "B," the clamps $f$ and $g$ embracing said forks, stems $e$ on clamp jaws $f$, sleeve "J" for said stems $e$, screws $i$ clamping stems $e$ in sleeve "J" screws $h$ for tightening clamps $f$ and $g$, bracket "I" pivoted to sleeve "J" at one end and carrying wheel "D" rigid on shaft $a$ in the other, one or more cranks 10 attached to shaft $a$, one or more rods 11 connecting said cranks with one or more pistons 12 operating in a corresponding number of chambers 13 open at the bottom and connecting at their top with a whistle 14, an operating rod for forcing said wheel to contact with wheel "A," and a spring for returning said parts to normal position, substantially as specified.

5. The combination of the wheel "A." forks "B." a wheel "D" rigid on a shaft $a$ turning freely in bearings in the bracket "E" and "I," clamps $f$ and $g$ embracing said forks "B" and carrying bracket "I," one or more cranks 10 rigid on shaft $a$, one or more rods 11 connecting said cranks with one or more pistons 12 operating in a corresponding number of chambers 13 connecting at their top with the whistle 14, a tube "F" secured to bracket "E." a rod "G" adjustable in the bore of tube "F," means for locking rod "G" and tube "F" together at convenient points, a fulcrumed operating lever "H" pivoted to rod "G" for forcing said wheel "D" to contact with wheel "A," and a spring for returning said parts to normal position, substantially as specified.

6. The combination of the wheel "A," a wheel "D" adapted to contact at intervals with, and be rotated by, said wheel "A," one or more cranks 10 operated by wheel "D," one or more rods 11 connecting said cranks with one or more pistons 12 reciprocating in a corresponding number of chambers 13 connected with a whistle 14, and a guard 18 shielding from injury each crank 10 and rod 11, substantially as and for the purpose specified.

7. The combination of the forks B, a wheel A, a wheel D adapted to contact at intervals with and be rotated by said wheel A, clamps embracing each of said forks, projections on said clamps, an intervening member carried by said clamps and adjustably secured to both said projections, means carried by said member for guiding wheel D to and from wheel A, mechanism operated by wheel D for causing one or more pistons 12 to reciprocate in a corresponding number of chambers 13 connecting with a whistle 14, and a guard 18 shielding said reciprocating mechanism from injury, substantially as specified.

8. The combination of the forks B, a wheel A, a wheel D, a spring pressed rod adapted to force wheel D to contact at intervals with and be rotated by said wheel A, clamps embracing each of said forks, projections on said clamps, an intervening member carried by said clamps and adjustably secured to both said projections, means carried by said member for guiding wheel D to and from wheel A, and mechanism operated by wheel D for causing one or more pistons 12 to reciprocate in a corresponding number of chambers 13 connecting with a whistle 14, substantially as specified.

9. The combination of forks B, a wheel A, a wheel D, a spring pressed rod adapted to force wheel D to contact at intervals with and be rotated by said wheel A, clamps embracing each of said forks, projections on said clamps, an intervening member carried by said clamps and adjustably secured to both said projections, means carried by said member for guiding wheel D to and from wheel A, mechanism operated by wheel D for causing one or more pistons to reciprocate in a corresponding number of chambers connecting with a whistle; the said whistle, chambers, pistons, reciprocating mechanism and wheel D, being mounted upon said spring pressed rod or a frame movable therewith, substantially as specified.

10. The combination of the forks B, a wheel A, a wheel D adapted to contact at intervals with and be rotated by said wheel A, clamps embracing each of said forks, projections on said clamps, an intervening member carried by said clamps and adjustably secured to both said projections, and means carried by said member for guiding wheel D to and from wheel A, substantially as specified.

11. The combination of the forks B, a wheel A, a wheel D adapted to contact at intervals with and be rotated by said wheel A, clamps embracing each of said forks, projections on said clamps, an intervening separate member loosely carried upon said projections, means for adjustably securing said member centrally between said clamps, a guide-frame carried by said member for guiding wheel D to and from wheel A, mechanism operated by wheel D for causing one or more pistons 12 to reciprocate in chambers 13 connected to a wind instrument, and guard pieces 18, shielding said reciprocating mechanism from injury, substantially as specified.

12. The combination of the forks B, a wheel A, a wheel D, a spring pressed rod adapted to force wheel D to contact at intervals with and be rotated by said wheel A, clamps firmly embracing each of said forks, projections on said clamps, an intervening separate member loosely carried upon said projections, means for adjustably securing said member centrally between said clamps, a guide-frame carried by said member for guiding wheel D to and from wheel A, and mechanism operated by wheel D for supplying air to a wind instrument 14, substantially as specified.

WILLIAM G. CROOK.

Witnesses:
IRA C. KOEHNE,
A. E. PRICE.